Sept. 12, 1950      M. COLLIS      2,521,777

AUTOMATIC SAW SHARPENING MACHINE

Filed Feb. 12, 1949      5 Sheets-Sheet 1

INVENTOR.
Melvin Collis
BY L. B. James
Attorney.

Sept. 12, 1950  M. COLLIS  2,521,777
AUTOMATIC SAW SHARPENING MACHINE
Filed Feb. 12, 1949  5 Sheets-Sheet 2
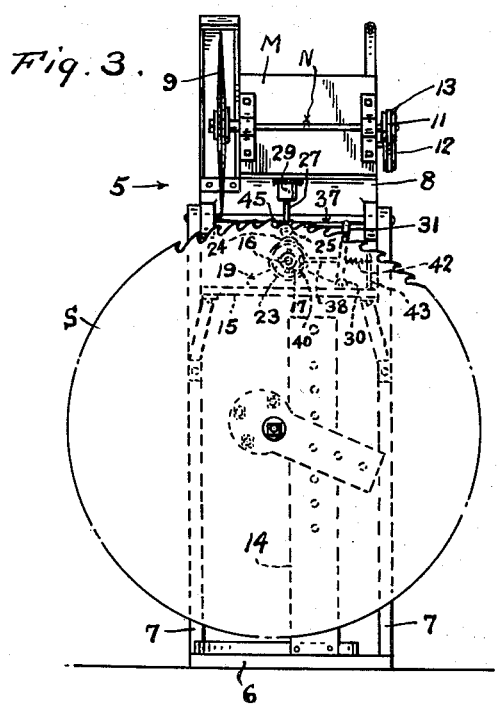
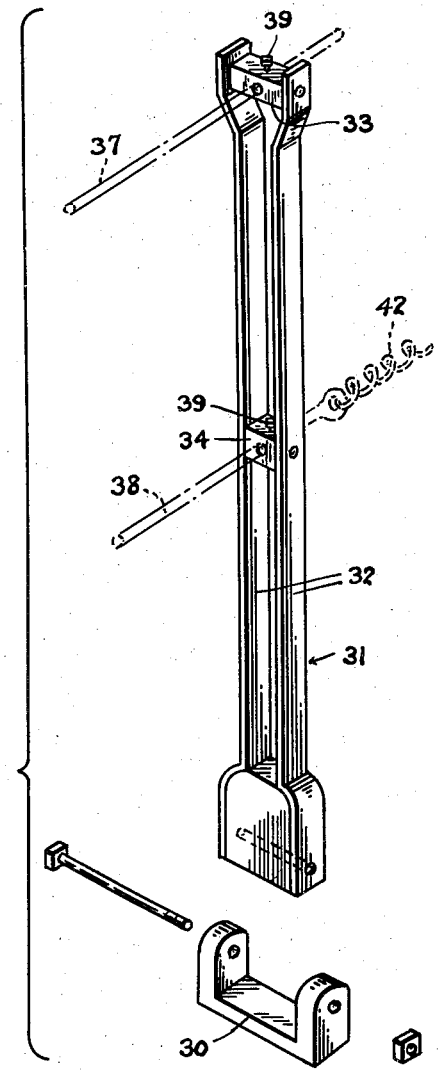
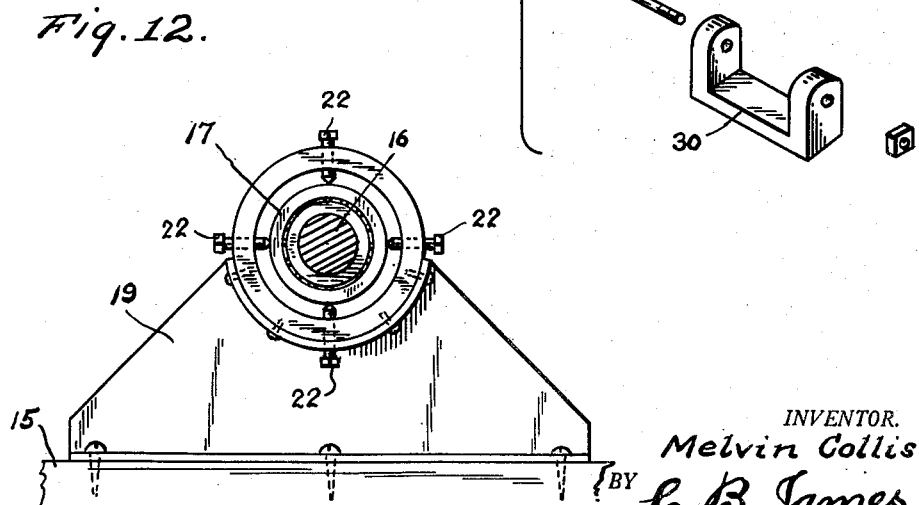
INVENTOR.
Melvin Collis
BY L. B. James
Attorney.

Sept. 12, 1950 M. COLLIS 2,521,777
AUTOMATIC SAW SHARPENING MACHINE
Filed Feb. 12, 1949 5 Sheets-Sheet 3
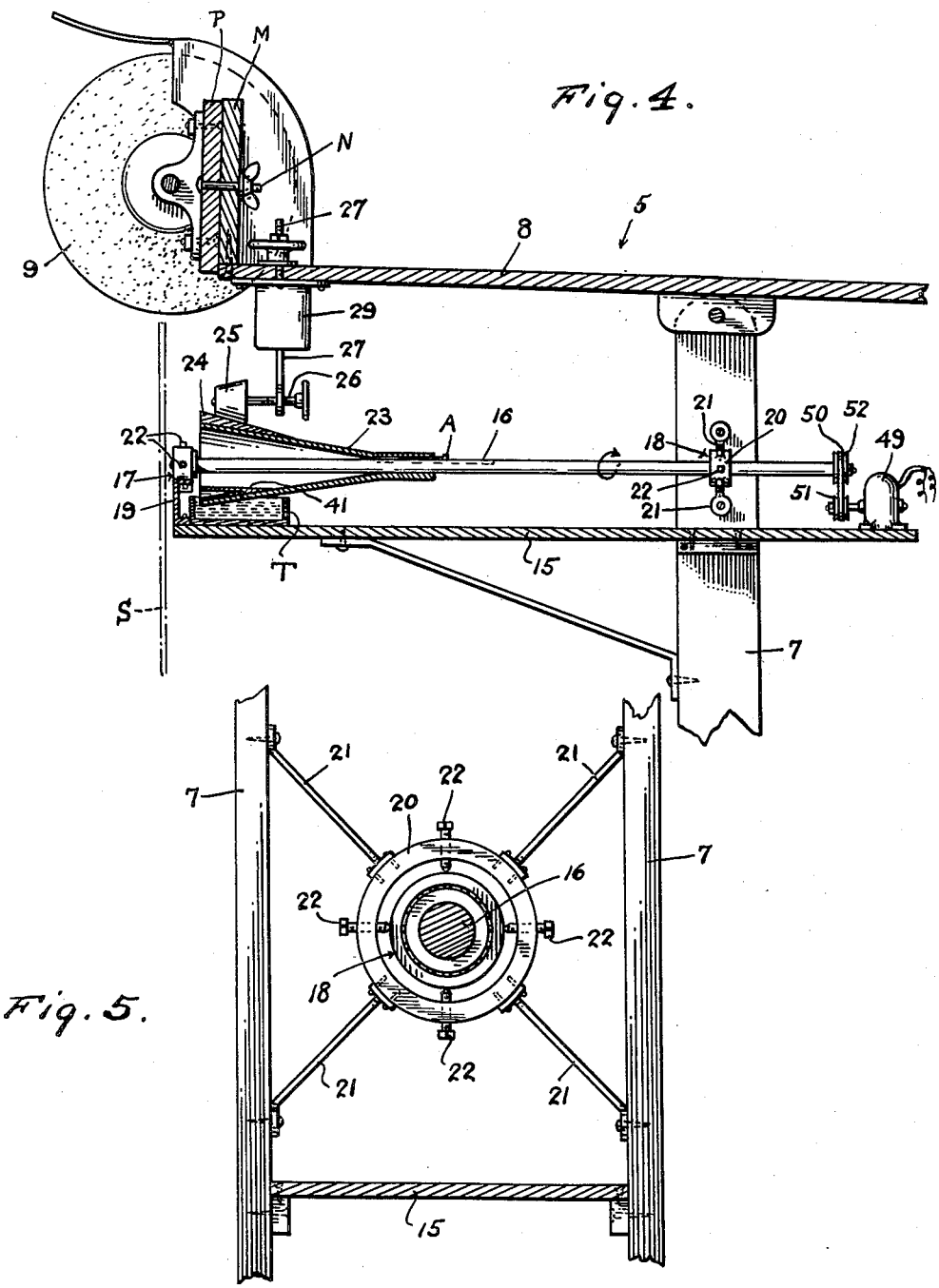
INVENTOR.
Melvin Collis
BY L. B. James
Attorney.

Sept. 12, 1950 M. COLLIS 2,521,777
AUTOMATIC SAW SHARPENING MACHINE
Filed Feb. 12, 1949 5 Sheets-Sheet 4
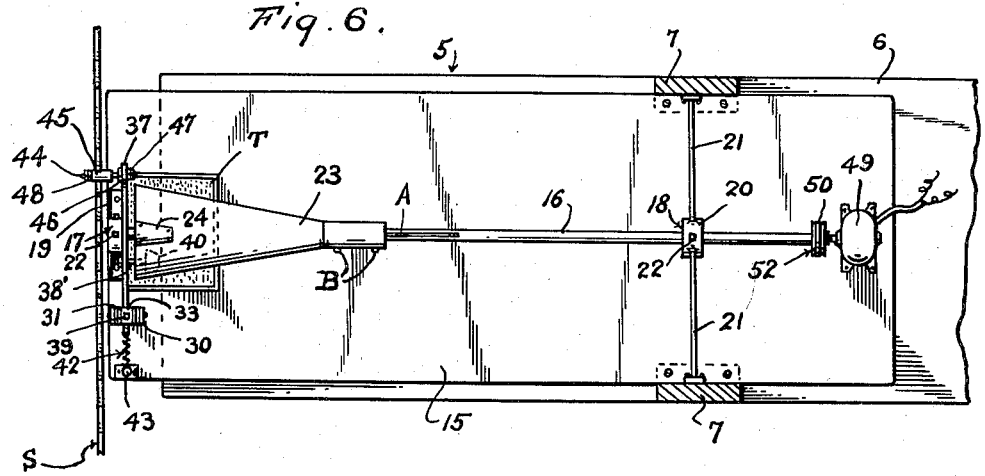
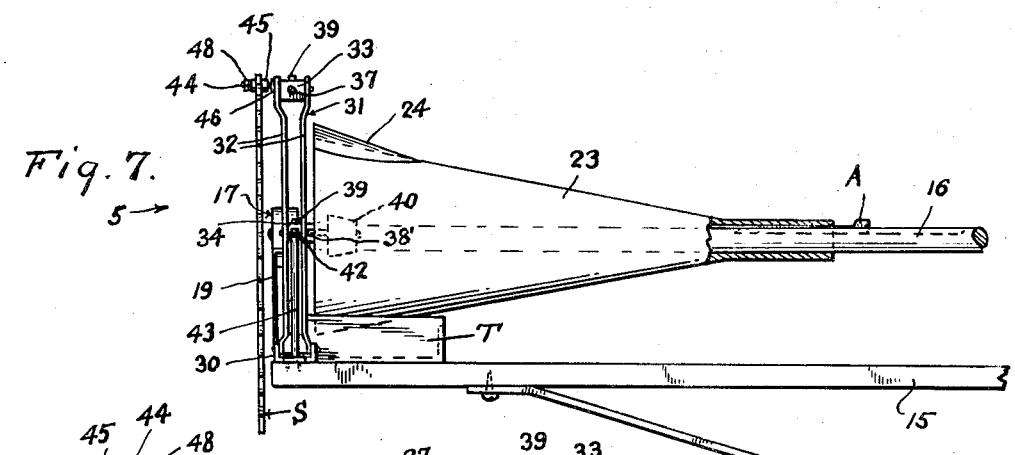
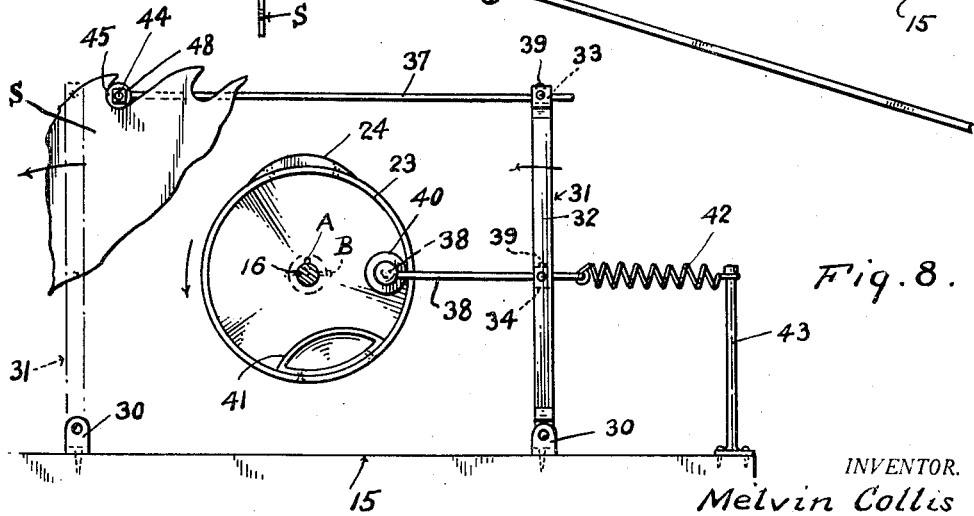
INVENTOR.
Melvin Collis
BY L. B. James
Attorney.

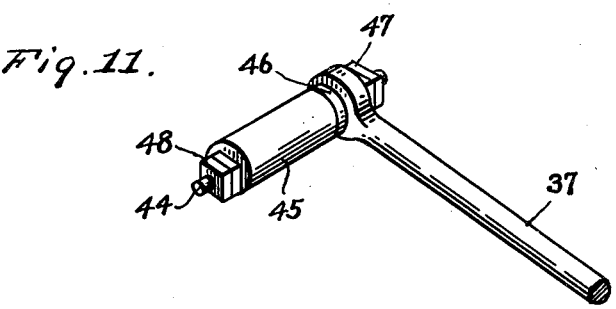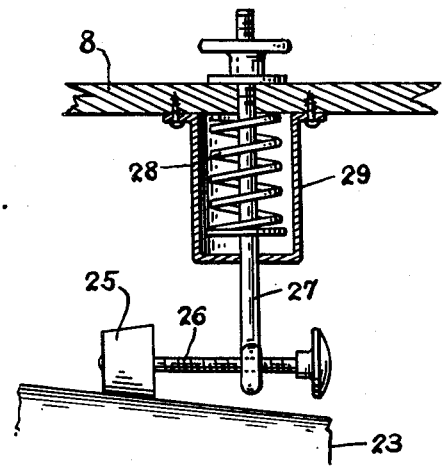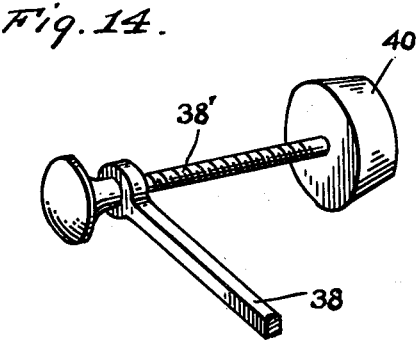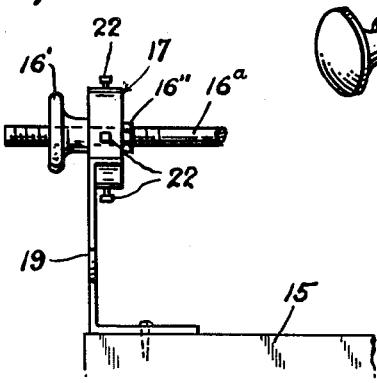

Patented Sept. 12, 1950

2,521,777

UNITED STATES PATENT OFFICE 2,521,777

AUTOMATIC SAW SHARPENING MACHINE

Melvin Collis, Klamath Falls, Oreg.

Application February 12, 1949, Serial No. 76,053

1 Claim. (Cl. 76—40)

This invention relates to a saw tooth sharpening machine and more particularly to improvements on the machine set forth in my pending application Serial No. 57,267 which issued as Patent No. 2,501,498, March 21, 1950.

The primary object of this invention resides in the provision of a saw tooth sharpening machine adapted to automatically shift the teeth of a saw thereon in opposed relation to the grinding wheel prior to disposing the grinding wheel in contact therewith.

Another object of this invention resides in the particular combination of the saw and grinding wheel operating means.

A further object of this invention resides in the particular construction of the saw and grinding wheel operating elements.

With these and other objects in view, this invention resides in certain novel features of construction and arrangement of elements to be hereinafter more fully set forth in the specification, illustrated in the accompanying drawings and pointed out in the appended claim and, although this disclosure depicts my present conception of the invention, the right is reserved to resort to such departures therefrom as come within the scope of the claim.

In the accompanying drawings forming a part of this application;

Fig. 3 is a front view of the machine.

Fig. 4 is a longitudinal sectional view taken approximately on line 4—4 of Fig. 2.

Fig. 5 is a vertical sectional view taken approximately on line 5—5 of Fig. 1.

Fig. 6 is a horizontal sectional view taken approximately on line 6—6 of Fig. 1.

Fig. 7 is an enlarged side view of the upper portion of the machine.

Fig. 8 is an enlarged front view of the saw tooth moving means.

Fig. 10 is a perspective view of the rocker arm.

Fig. 11 is a perspective view of the saw tooth feed finger and supporting arm thereof.

Fig. 12 is an end view of the front bearing of the funnel head shaft.

Fig. 13 is a detail side view partly in section of the bed plate supporting roller.

Fig. 14 is a detail perspective view of the inner cam engaging roller and its supporting arms.

Fig. 15 is a detail side view of the front bearing and adjustable shaft.

Figure 1:
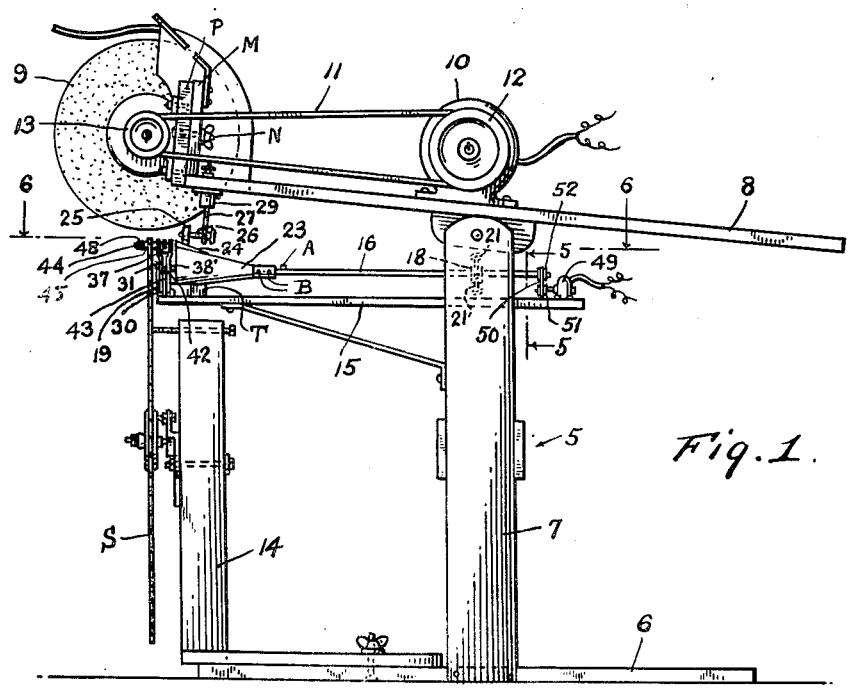
Fig. 1 is a side view of the saw sharpening machine.
Figure 2:
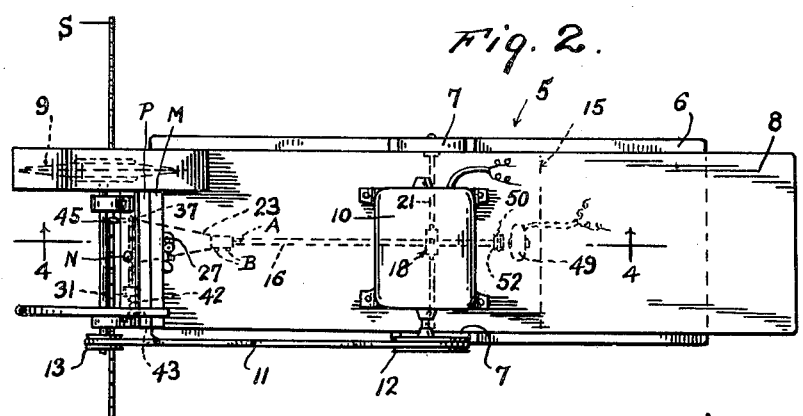
Fig. 2 is a plan view thereof.
Figure 9:
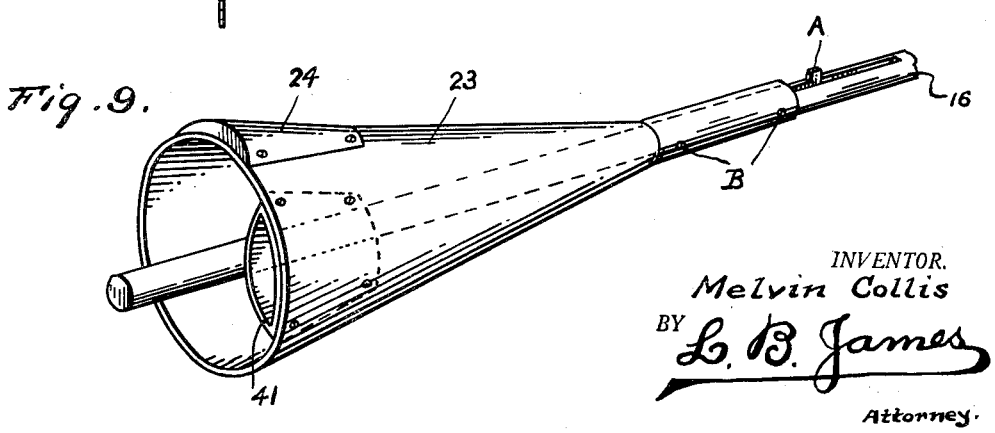
Fig. 9 is a perspective view of the funnel head and cams thereon.

In the present embodiment of this invention the numeral 5 designates, in general, a saw tooth sharpening machine comprising an elongated base 6 having laterally spaced standards 7 between the upper ends of which is pivoted an elongated bed plate 8 having a grinding wheel 9 journalled on a plate P adjustably secured to a stationary plate M by a bolt N at its front end and operated by an electric motor 10 through the instrumentality of a belt 11 trained over pulleys 12 and 13. However, it is within the purview of this invention to connect said grinding wheel with the motor in any well known power transmitting means.

Adjustably secured to the front portion of the base is a standard 14 in which is removably secured a disc saw S for step-by-step rotation beneath the aforesaid grinding wheel by means to be hereinafter set forth.

Rigidly secured between the standards 7 and with its front end terminating in close proximity to the disc saw is a platform 15 above which is disposed a shaft 16 mounted in front and rear bearings 17 and 18. Said front bearing is adjustably disposed in a bracket 19 secured to the front end of the platform while the rear bearing is adjustably secured to a bracket 20 fastened to the inner opposed sides of the standards 7 by legs 21. Although the aforesaid brackets are herein of cylindrical configuration and of greater diameter than the shaft bearings to permit adjustment and alignment of the shaft extending therethrough by a plurality of set-screws 22, it is to be understood the shaft may be likewise adjusted by other similar means.

Adjustably secured to the front portion of the shaft 16, as by a key A and set-screws B or the like, is a substantially funnel shaped head 23 on the outer periphery of which is removably secured a cam 24 adapted to raise the bed plate 8 through the instrumentality of a roller 25 secured to a short adjustable arm 26 carried at the lower end of a vertical shaft 27 adjustably secured to the bed plate against an extension coil spring 28 disposed within a casing 29 secured to the lower surface thereof. Said coil spring functions to yieldingly retain the roller against the outer periphery of the funnel head and cam thereon and also cushions contact of the grinding wheel with the saw teeth when the roller passes off the cam 24. Adjustment of the roller 25 relative to the vertical shaft regulates rocking movement of the bed plate on its pivot and thereby permits precision contact of the grinding wheel with the teeth of the saw.

In Fig. 15 of the drawings the funnel shaped head is fixed to a longitudinally adjustable shaft 16a operated by a hand wheel 16' and locked in position by a jamb-nut 16".

Secured to the forward end of the platform to one side of the open end of the funnel head is a bracket 30 in which is pivoted an upstanding rocker arm 31 consisting of spaced side members 32 adapted to pivotally support upper and lower blocks 33 and 34 having bores 35 and 36 extending therethrough for reception of upper and lower arms 37 and 38 secured thereto by set screws 39 or the like. Said lower arm 38 extends toward the axis of the funnel head in close proximity to its larger end and adjustably carries a roller 40 extending at right angles thereto and into the funnel head so as to yieldingly bear against the inner periphery thereof and a cam 41 removably secured therein under the influence of a retractile coil spring 42 securing it to a post 43 rigidly mounted on the platform outwardly of the rocker arm. The upper arm 37 extends laterally over the funnel head into close proximity to the saw and is provided with a stub shaft 44 extending at right angles thereto and carrying a saw tooth engaging finger 45 formed of suitable material and herein shown in the form of a roller so it will readily traverse the teeth of the saw and seat at the bases thereof. Said stub shaft is provided with a collar 46 adapted to be tightened against one side of the upper arm by lock nuts 47 screwed on its inner end while the aforesaid roller finger 45 is loosely retained on the opposite end thereof by other lock nuts 48.

Secured on the platform beneath the inner end of the shaft 16 is an electric motor 49 which is connected thereto by a belt 50 trained over pulleys 51 and 52. However, it is to be understood the motor may be connected to said shaft by any well known power transmitting elements capable of operating the elements of this invention in a manner heretofore set forth.

In order to lubricate the funnel head and cams thereon so the rollers contacting therewith will traverse the same smoothly, a trough T containing oil is disposed beneath the open end of the funnel head.

With a saw mounted on its supporting standard in proper grinding relation to the grinding wheel and elements operated by the funnel head adjusted in accordance with the work to be performed, the electric motors of the grinding wheel and funnel head shaft are started to rotate the same whereupon the roller seated on the outer cam of the funnel head will gravitate to the outer periphery thereof and cause the grinding wheel to engage and grind that tooth contacted thereby until it is again lifted by said outer cam at such time the inner cam on the funnel head manipulates the rocker arm which in turn pushes the tooth engaging finger until the next succeeding tooth is disposed for engagement by the grinding wheel when again gravitated into grinding position. Said operation is repeated until all the teeth of the saw have been sharpened.

Through the instrumentality of the elements comprising this invention it is manifest that a saw tooth sharpening machine is provided which will automatically perform the functions of its adoption.

Having thus described my invention, what I claim and desire to protect by Letters Patent is:

A saw tooth sharpening machine comprising a base, laterally spaced standards secured to the base, an elongated bed plate pivotally secured between the upper ends of the standards, a grinding wheel journalled on the front end of the bed plate, an electric motor secured to the bed plate forwardly of the pivotal point thereof, power transmitting means connecting the electric motor to the grinding wheel, a platform rigidly secured between the standards and below the bed plate, a saw supporting standard adjustably secured on the front end of the base, a saw movably mounted on said saw supporting standard, a bracket secured to the front end of the platform, a bracket secured between the first mentioned standards in alignment with said bracket on the front end of the platform, bearings disposed in said brackets, set screws securing said bearings in the brackets, a shaft mounted in said bearings, a funnel head fixed to the front end of the shaft, an electric motor connected to the rear end of the shaft, a cam removably secured to the outer periphery of the funnel head, a cam removably secured to the inner periphery of the funnel head, a rocker arm pivotally secured to the platform adjacent the open end of the funnel head, a lower arm pivotally connected to the rocker arm with its outer end extending toward the shaft of the funnel head, an adjustable roller secured to the outer end of said lower shaft and extending at right angles thereto into contact with the inner periphery of the funnel head and path of the inner cam carried thereby, a post rigidly secured to the platform adjacent the rocker arm, a retractile coil spring connecting the roller shaft to the post, an upper arm pivotally connected to the upper end of the rocker arm with its outer end extending laterally over the funnel head, a tooth engaging roller secured to the outer end of the upper arm, a vertical shaft adjustably secured to the bed plate at a point over the funnel head, a stub shaft adjustably mounted in the lower end of the vertical shaft, a roller mounted on the stub shaft and bearing on the outer periphery of the funnel head in the path of the outer cam thereon, an expansion coil spring surrounding the upper end of the vertical shaft and yieldingly retaining the roller thereon against the outer periphery of the funnel head, a casing surrounding the expansion coil spring, and a lubricating trough secured to the platform and receiving the working end of the funnel head.

MELVIN COLLIS.

REFERENCES CITED

The following references are of record in the file of this patent:

UNITED STATES PATENTS

| Number | Name | Date |
|---|---|---|
| 352,802 | Blackmer | Nov. 16, 1886 |
| 381,775 | Halladay | Apr. 24, 1888 |
| 2,470,290 | Chryst | May 17, 1949 |

FOREIGN PATENTS

| Number | Country | Date |
|---|---|---|
| 99,234 | Sweden | Apr. 25, 1940 |